P. C. LITTLE.
VACUUM APPARATUS.
APPLICATION FILED JUNE 11, 1909.
996,991.
Patented July 4, 1911.
2 SHEETS—SHEET 1.
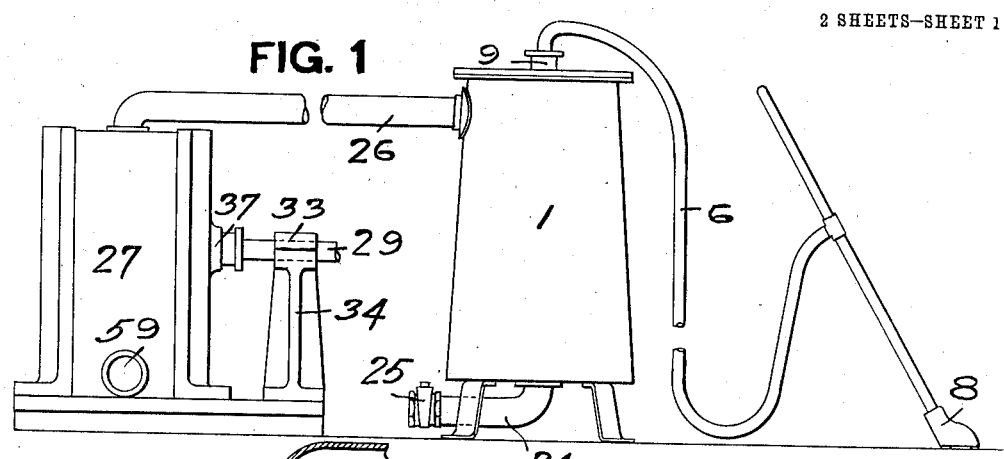
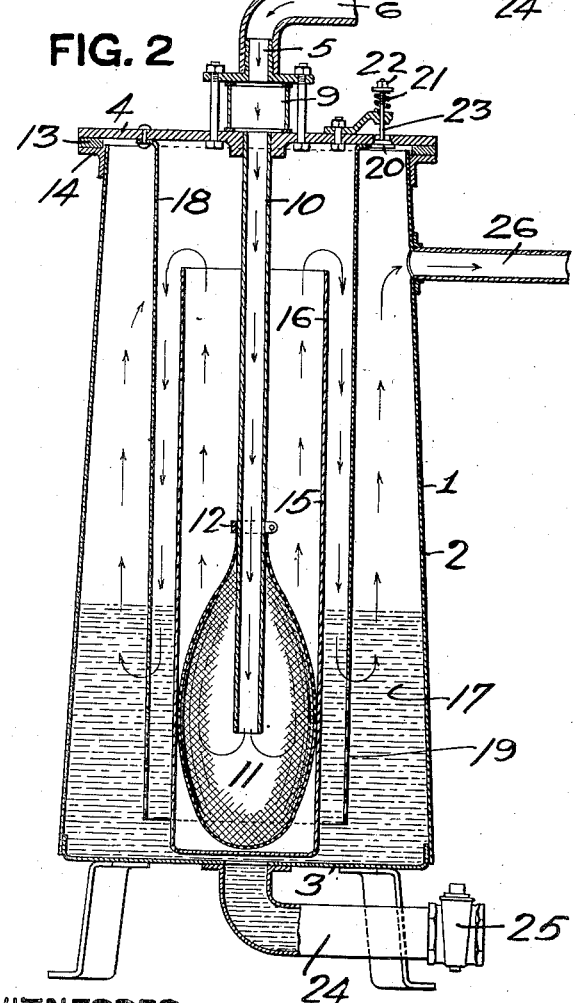
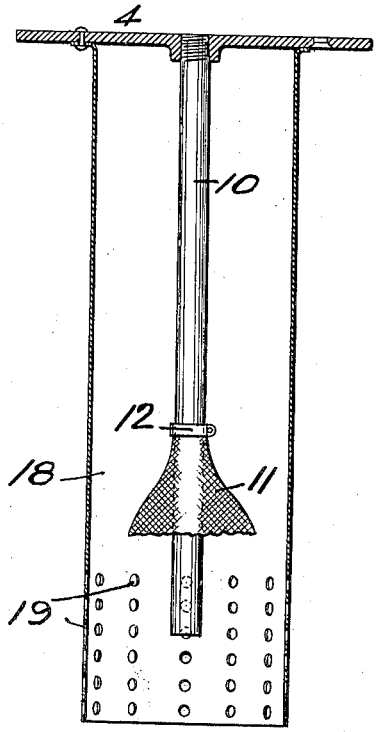
WITNESSES.
INVENTOR.
Paul C. Little P. C. LITTLE.
VACUUM APPARATUS.
APPLICATION FILED JUNE 11, 1909.
996,991.
Patented July 4, 1911.
2 SHEETS—SHEET 2.
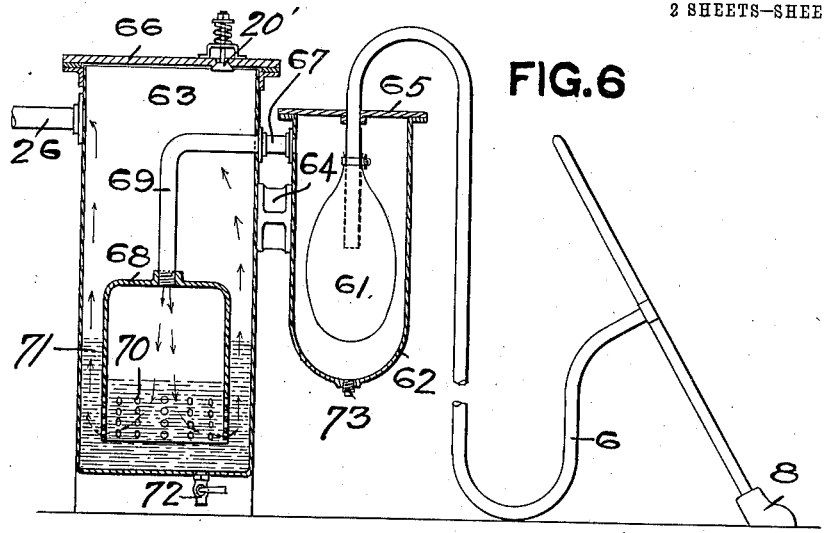
FIG. 6
FIG. 5
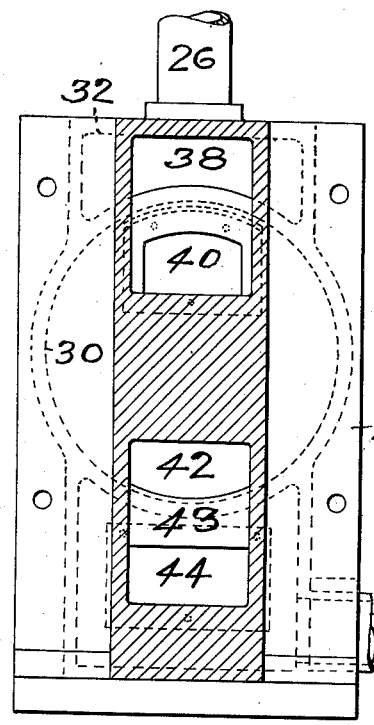
FIG. 3
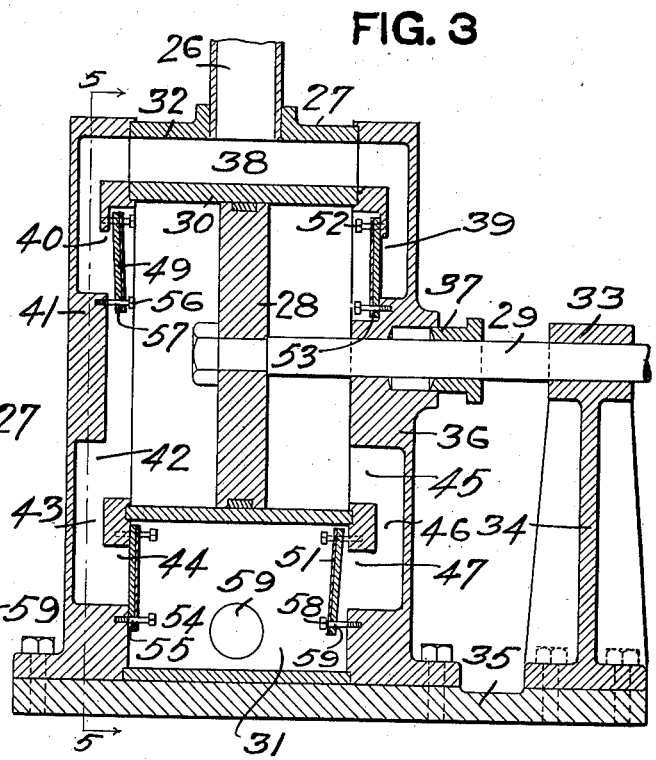
WITNESSES.
J. R. Keller
Robert C. Totten
INVENTOR.
Paul C. Little
By Kay & Totten
Attorneys

UNITED STATES PATENT OFFICE.

PAUL C. LITTLE, OF CARNEGIE, PENNSYLVANIA, ASSIGNOR TO CLEANING DEVICES MANUFACTURING COMPANY, OF PITTSBURG, PENNSYLVANIA, A CORPORATION OF PENNSYLVANIA.

VACUUM APPARATUS.

996,991.  Specification of Letters Patent.  Patented July 4, 1911.

Application filed June 11, 1909. Serial No. 501,626.

*To all whom it may concern:*

Be it known that I, PAUL C. LITTLE, a resident of Carnegie, in the county of Allegheny and State of Pennsylvania, have invented a new and useful Improvement in Vacuum Apparatus; and I do hereby declare the following to be a full, clear, and exact description thereof.

My invention relates to vacuum apparatus and more particularly to stationary apparatus of this nature for use in dwellings or small buildings where a cheap and compact apparatus is desired. Its object is to provide a compact separator tank which will effectively remove the dust and other dirt from the incoming air; which can be readily cleaned and kept in working order, and which can be set up in a small space and which does not require expert attention.

To these ends my invention contemplates, generally stated, a vacuum or pneumatic separating apparatus provided with a suitable inlet to receive the air containing the dust, a suitable pump connection to maintain the air current, a wall of porous material arranged in the path of the air entering the inlet, a further cleansing medium, preferably water, oil or the like, and baffle plating adapted to direct the air into the cleansing medium.

In the drawings Figure 1 is a side view showing diagrammatically the separator and pump of my invention as installed. Fig. 2 is a vertical section of the separator, and Fig. 3 is a like section of the pump. Fig. 4 is a detail section of the removable top of the separator and attached mechanism, and Fig. 5 is an end view partly in section of the pump showing the valve box. Fig. 6 is a vertical sectional view illustrating a modified form of separator.

The separator 1 has the thin cylindrical wall 2 and the bottom 3 which is constructed water tight. It has the removable top 4, which is preferably constructed of heavier material than the sides so as to resist the atmospheric pressure brought to bear by the operation of the device. The separator 4 has the inlet 5 to which the hose 6 leading to the tool or collector 8 is attached. The inlet 5 is also preferably provided with the observation glass 9 for the purpose of enabling the operator to observe the operation of the apparatus. The inlet pipe 10 extends downwardly from the inlet, and attached to its lower end is the dry sack 11. This sack 11 is preferably held to the pipe 10 by the clamp 12. The removable top 4 is preferably provided with a rubber gasket 13 which fits on the beaded top 14 of the cylindrical side 2. The function of this gasket 13 is to form a tight air seal so as to fasten the top flush to the tank 1 when the apparatus is in operation.

Inclosing the sack 11 is the can or box 15 having the cylindrical side wall 16, which acts as a baffle plate. This box or can 15 is of water tight construction, and floats or rests in the water 17 which normally fills the bottom of the separator tank 1. Attached to the top 4 is the baffle plating 18 which is preferably of cylindrical construction, inclosing the side 16 of the can 15. This baffle plating 18 extends below the normal water level in the tank and is provided in its bottom portion with the holes 19, as shown. The top 4 is also provided with the safety valve 20 which has the coiled spring 21 and nut 22 working on the threaded stud 23 by which the resistance of the spring may be adjusted. As the top is held tight to the tank 1 merely by atmospheric pressure during operation, this valve acts to prevent the vacuum within the apparatus becoming too high, and affords a ready means of regulating the suction when light or frail objects are being cleaned. The pipe 24 is connected to the bottom of the separator 1 and is provided with the valve 25 by means of which the used and dirty water may be flushed out of the separator 1. The pipe 26 leads to the pump 27. When, under the influence of the pump 27, the suction of air through the tool 8, hose 6 and separator 1 is effected, the removable top 4 is forced downwardly against the beaded top 14 of the separator, and the air containing dust, dirt and small objects is sucked into the dry sack 11 and through a tortuous passage around the baffle plating 16 and 18, as indicated in Fig. 2, and through the pipe 26 to the pump. The sack 11 is constructed of hop-sacking, cotton, wire mesh or other finely porous material, and serves to remove the grosser impurities and a large part of the dust from the incoming air. After passing through the sack 11 the air, still containing some dust and finer impurities, is sucked up through the tortuous passage around the baffle plating 16 and through the water 17 and holes 19 in the baffle plating 18 and around the baffle plating 18 through the pipe 26 to the pump. The water 19 will be caused to bubble or foam under this suction and rise around the baffle plating 18 and at the same time absorb the impurities left after passing the dry sack 11.

The apparatus is very simple and compact in structure and serves efficiently to remove the impurities from the incoming air, which have been gathered up in the usual manner in vacuum systems by the tool 8 operated by hand. When it is desired to clean the separator the pump is stopped and the top 4 lifted, carrying with it the dry sack 11. This sack may then be removed and burned, or destroyed in any manner, and the pipe 10 conveniently cleaned. A new sack can be readily attached by the clamp 12. The dirty water 17 is flushed out by the valve 25 and a clean stream of water is preferably flushed through the separator so as to effectively clean it internally, the case 16 being also removed and cleaned. The top 4 and its attached parts can then be readily restored to operative position; and the device is then ready for renewed operation.

Fig. 6 illustrates a modified form of apparatus. The dry sack 61 is here carried in the receptacle 62 suspended from the separator tank 63 by the arms 64. The receptacle 62 has the removable suction top 65, and the separator tank 63 has the like top 66. The pipe 67 leads from the receptacle 62 to the tank 63. The inverted baffle box 68 is carried by the elbow extension 69 of the pipe 67, and is provided with the holes 70 under the water 71. The collector tool 8, hose 6, pipe 26 and valve 20' are similar to these parts as employed in the embodiment of Figs. 1, 2 and 4. The flush cock 72 is attached to the tank 63 for cleaning purposes, and the cock 73 to the receptacle 62. This device is analogous in operation to the former embodiment, the air passing first through the dry sack 61, and then in succession through the receptacle 62, pipe 67, baffle box 68 and holes 69, and water 70 to the pipe 26 leading to the pump. The top 65 can be removed and the dry sack 61 replaced without disturbing the other parts of the apparatus; and the apparatus can be conveniently set up in a space of very moderate height.

The pump 27 has the piston 28 and piston rod 29, which is driven by any suitable engine or motor, not shown. The pump cylinder 30, valve box 31, and intake passage box 32 may be conveniently cast integrally. The bearing 33 is conveniently carried by the casting 34 attached to the bed plate 35 of the pump. The cylinder head 36 is provided with the stuffing box 37 around the piston rod 29. The intake pipe 26 opens into the intake passage 38, which connects with the port 39 in the cylinder head 36, and with the opposite port 40 in the cylinder head 41. The port 42 in the cylinder head 41 opens into the passage 43 which opens by the port 44 into the valve box 31 and the opposite port 45 in the cylinder head 36 opens into the passage 46 which leads to the port 47 into the valve box 31. The puppet valves 48 and 49 play on the ports 39 and 40 respectively, and the puppet valves 50 and 51 play on the ports 44 and 47 respectively. The puppet valve 48 is provided with the studs 52 in the cylinder head 36 and the holes 53 through which these studs extend. The puppet valve 51 has the studs 58 in the cylinder head 36 and the like holes 59. The puppet valve 50 has like studs 54 in the cylinder head 41 and like holes 55, and the puppet valve 49 has the like studs 56 in the cylinder head 41 and like holes 57. These puppet valves all operate inwardly, as shown. When the piston 28 is making the forward stroke air is sucked through the collector tool 8, the separator 1 and pipe 26, and through the port 39 into the pump cylinder 27. On the backward stroke of the piston rod 29 the air in the pump cylinder 27 behind the piston 28 is forced through the port 45, passage 46, and port 47 past the opened valve 51 into the valve box 31 and out through the exhaust 59. At the same time the valve 48 is closed and likewise the valve 50, and the valve 49 is opened by the suction action in the cylinder 27 and the air sucked into the cylinder in front of the piston. At the next forward stroke this air is forced through the passages 42, 43 and 44 past the open valve 50 into the valve chest 31 and out through the exhaust 59, the valve 49 being closed.

The puppet valves of my device are simple and cheap of construction and effective in operation and I have found them very effective in a pump for use in connection with the separator of my invention, as they provide the necessary air-tight closure for the ports and at the same time are almost "fool-proof" and very unlikely to get out of order or require repair. This is of special advantage in apparatus of this nature, designed particularly for use in dwellings and small buildings where an expert mechanic to operate the apparatus is not employed.

What I claim is:

1. In vacuum separating apparatus having an inlet and a suitable pump connection, a wall of porous material arranged in the path of the air entering through said inlet, a further cleansing medium, and baffle plating adapted to direct said air into said cleansing medium.

2. Vacuum separating apparatus provided with inlet means and having a dry sack of porous material in line therewith, baffle plating in the path of the incoming air after passing said sack, and means for carrying water in the further path of the incoming air, the said water being separated from the said dry sack by the said baffle plating.

3. Vacuum separating apparatus including a tank provided with a removable top and a suitable inlet in said top, a dry sack of porous material supported by said top and connected to said inlet, and a substantially cylindrical baffle plate supported by said top and surrounding said dry sack.

4. A separator for vacuum apparatus comprising a tank having a suitable inlet, a dry sack of porous material in the path of the incoming air through said inlet, a can having an open top and closed bottom inclosing said porous sack, baffle plating outside of said can, and a suitable outlet for the air after passing said baffle plating.

5. A separator for vacuum apparatus comprising a tank having a removable top, a suitable inlet pipe through said top, a porous sack attached to said inlet pipe, a can in said tank inclosing said sack and having an open top, a baffle plate attached to said removable top to provide a tortuous passage for the incoming air after passing said can, and a suitable outlet.

6. A separator for vacuum apparatus comprising a tank having a removable top, a suitable inlet pipe through said top, a porous sack attached to said inlet pipe, a can in said tank inclosing said sack and having an open top, an annular baffle plate attached to said removable top and inclosing said can, and a suitable outlet.

7. A separator for vacuum systems comprising a tank having a suitable inlet and a dry sack of porous material in the path of the incoming air through said inlet, said tank being adapted to hold a suitable amount of water, a can in said tank having an open top and inclosing said sack and separating it from said water, baffle plating in the path of said incoming air through said separator and adapted to direct it through said water, and an outlet for said air.

8. A separator for vacuum apparatus comprising a tank provided with a removable top and adapted to carry a suitable amount of water, a dry sack attached to a suitable inlet through said top, a can in said water inclosing said sack and having an open top and being adapted to separate said sack from said water, an annular baffle plate attached to said removable top and extending normally into said water and provided with holes under water, and an outlet for the cleansed air.

9. A separator for vacuum apparatus comprising a tank provided with a removable top and adapted to carry a suitable amount of water, a dry sack attached to a suitable inlet through said top, a can in said water inclosing said sack and having an open top and being adapted to separate said sack from said water, an annular baffle plate attached to said removable top and extending normally into said water and provided with holes under water, an outlet for the cleansed air, and a flush valve in said tank.

In testimony whereof, I the said PAUL C. LITTLE have hereunto set my hand.

PAUL C. LITTLE.

Witnesses:
ROBERT C. TOTTEN,
J. F. WILL.